July 7, 1942.   L. G. KRUG   2,289,274
OIL SEAL
Filed May 1, 1939

INVENTOR.
Louis G. Krug,
BY Cromwell, Greist & Warden.
ATTORNEYS.

Patented July 7, 1942

2,289,274

UNITED STATES PATENT OFFICE 2,289,274

OIL SEAL

Louis G. Krug, Chicago, Ill., assignor to Chicago Rawhide Manufacturing Company, Chicago, Ill., a corporation of Illinois Application May 1, 1939, Serial No. 271,045

2 Claims. (Cl. 286—11)

This invention has to do with oil seals of the end-thrust type, in which the sealing portion is pressed axially into resiliently yieldable engagement with a relatively rotatable portion of some associated machine part.

The purpose of the invention is to provide an improved seal of the character described which is simple in construction, is inexpensive to manufacture, is easy to install with just the right amount of pressure imparted to the sealing portion, will give good sealing results over a long period of time, and will maintain its sealing pressure without appreciable fatigue.

While the foregoing statements are indicative in a general way of the nature of the invention, other more specific objects and advantages will be apparent to those skilled in the art upon a full understanding of the construction, installation and manner of operation of the improved seal.

A preferred embodiment of the invention is presented herein for the purpose of exemplification, but it will be appreciated that the invention is susceptible of embodiment in other structurally modified forms coming equally within the scope of the appended claims.

Figure 1:
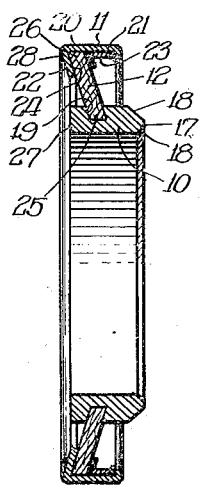
Fig. 1 is a diametric section through an end-thrust seal constructed in accordance with the invention.
Figure 2:
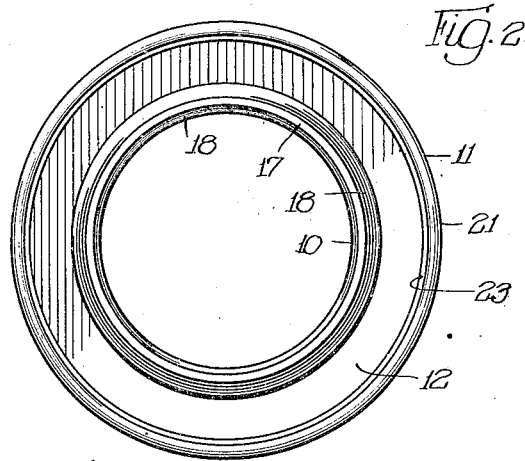
Fig. 2 is an end view of the same.
Figure 3:
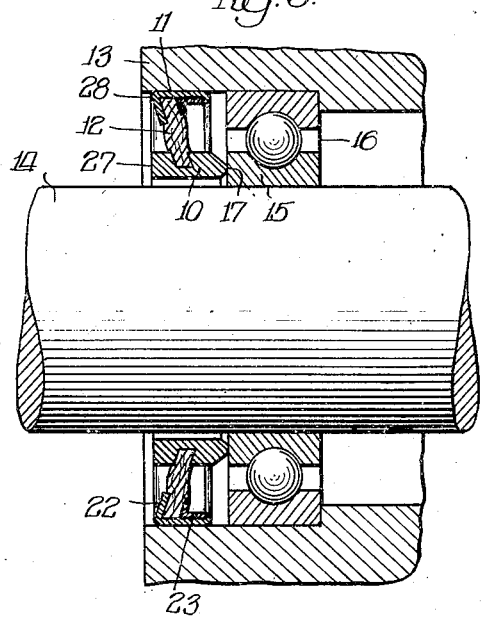
Fig. 3 is another diametric section through the same, showing the seal in operative position within a housing about a shaft.

The seal shown in the drawing is a self-contained unit of exceedingly simple construction, consisting merely of an inner ring 10, an outer ring 11, and a centrally apertured connecting disk 12. This seal, in the particular form shown, is adapted to be press fitted into a housing 13, about a shaft 14, in sealed association at one end with the inner race 15 of a bearing 16 or other collar-like formation on the shaft.

The inner ring 10 is preferably made of some hard synthetic resin material, such as "Bakelite," but it may of course be made of other materials, such as iron, steel, bronze or brass, depending on the use for which the seal is intended. This ring is slightly larger than the shaft 14 or other member passing through the same and is provided on one end with a finely ground sealing face 17. The face 17 is of annular shape and is preferably somewhat narrower than the ring proper, either the inner or the outer edges of the ring or both being beveled, as at 18, to reduce the area of contact. The inner ring 10 is provided in its outer periphery with an annular channel 19, which channel is inclined outwardly at an angle in a direction away from the sealing face 17. The angle of inclination is preferably somewhere between 15 and 30 degrees, but either larger or smaller angles might be used with satisfactory results.

The outer ring 11 is preferably made of sheet metal, in two parts. One of the parts is a centrally apertured cup 20 which has a cylindrical rim 21 for press fit engagement within the housing 13 and a narrow angularly inturned bottom flange 22. The other part is a similarly shaped but slightly smaller cup 23. The cup 23 is positioned within the rim 21, in spaced relation to the bottom flange 22, and the edge of the rim 21 is spun over the edge of the cup 23 to hold the latter within the rim. The angularly inturned bottom flange 22 of the cup forms with the corresponding flange of the cup 23 an annular channel 24 about the inner periphery of the outer ring, which channel is inclined inwardly at an angle in a direction toward the sealing face 17 on the inner ring.

The disk 12 is composed of a synthetic rubber material, such as "neoprene," which has practically all of the characteristics of soft rubber but is impervious to oil and grease. The disk 12 before assembly with the other parts of the seal is preferably flat, being either cut from a flat sheet of the material or else molded in flat form. If molded, however, the disk may if desired be given at the outset the generally conical form shown in Fig. 1. The inner periphery 25 of the disk, when assembled with the inner ring 10, will be held tightly and snugly within the angularly directed channel 19 in the inner ring, while the outer periphery 26 of the disk, when assembled with the outer ring 11, will be clamped tightly within the angularly directed channel 24 in the outer ring. In assembling the disk with the inner ring the inner periphery 25 of the disk can be stretched over the ring and allowed to snap down into the bottom of the channel 19. When the parts are assembled, as shown in Fig. 1, the angular positioning of the channels 19 and 24, in substantial line with each other, will give the initially flat disk the conical shaping shown.

In installing the seal in the housing 13 about the shaft 14 the outer ring 11 of the seal is pushed in with a press fit until the sealing face 17 of the inner ring 10 has come into engagement with the inner race 15 of the bearing, after which the outer ring 11 is pushed in still more with the inner ring 10 held against further movement, resulting in the disk 12 becoming resiliently compressed along a line connecting its inner and outer edges. This compression of the disk, which results from the shortening of the distance between the bottoms of the channels 19 and 24, provides the force which tends to maintain the sealing face 17 in resiliently yieldable fluid-tight engagement at all times with the opposed surface on the end of the inner bearing race. In installing the seal the outer ring 11 is preferably advanced about a sixteenth of an inch more than the inner ring 10 in a small size seal, so as to give approximately that range of end thrust to the inner ring. The amount of axially directed pressure imparted to the inner ring 10 by the disk 12 will of course depend on several factors, such as the thickness of the disk, the distance between the outer edges of the channels in the rings, and the closeness of the fit of the inner and outer peripheries of the disk with the bottom surfaces of the channels, all of which can be varied to suit conditions. A pressure of somewhere between six and ten pounds to the square inch of actual sealing face area will be found to give very good results.

When the seal is in its normal position before installation and before the sealing face 17 has been pushed back, the end 27 of the inner ring which is opposite the end having the sealing face 17 is preferably offset axially with respect to the corresponding end 28 of the outer ring 11 for a short distance, which distance is the same as that which the inner ring is subsequently pushed back within the outer ring when the outer ring is so positioned in the housing 13 as to impart the right amount of end thrust to the inner ring. By making these distances equal, the installation of the seal becomes an exceedingly simple matter. In installing the seal it is merely necessary to put a flat ram against the end 28 of the outer ring 11 and push the outer ring into the housing 13 until the movement of the ram is stopped by engagement of the same with the end 27 of the inner ring after the latter has been stopped by reason of its engagement with the inner race 15 of the bearing. With the ends 27 and 28 of the two rings flush, the correct amount of compression will be set up in the disk 12 and the corerct amount of pressure will be exerted by the same through the inner ring and the sealing face 17.

From the foregoing description it will be appreciated that the end-thrust pressure set up in the seal is due primarily to a compression of the material of the disk, as distinguished from a flexing of the same, which compressive action is less susceptible to fatigue in the material and tends to tighten the engagement of the inner and outer rings with the inner and outer edges of the disk. The "growing" characteristic of some synthetic rubber materials, although objectionable in ordinary seals, will react to advantage in a seal of this construction, any gradual enlargement of the dimensions of the disk between its inner and outer edges tending to further compress the material of the disk and thereby increase the axial pressure exerted on the inner ring.

Instead of making up the disk 12 out of flat stock and positioning the channels 19 and 24 at angles which will cause the disk to assume the conical shape desired, the disk may be initially molded in a conical shape, in which event the channels can be directed either angularly or straight out with respect to the rings.

I claim:

1. An end-thrust seal comprising an inner ring having a sealing surface at one end for resiliently yieldable engagement with an opposed surface of a relatively rotatable part, an outer ring surrounding the inner ring in spaced concentric relation to the latter, and a centrally apertured disk of resilient synthetic rubber material connected at its inner and outer edges to the rings, said rings being provided with annular channels for the reception of the edges of the inner and outer edges of the disk with the channel in the outer ring inclined toward the sealing surface of the inner ring and the channel in the inner ring inclined away from such surface, whereby to impart a generally conical shape to the disk, with the small end of the cone directed toward said sealing surface, the rear wall of the channel in said outer ring extending inwardly to provide a support for the rear conical face of the disk a substantial distance inwardly from its outer periphery, whereby to hold the disk against flexing upon axial movement of the inner ring and result in compression of the resilient material of the disk upon such axial movement.

2. An end-thrust seal comprising an inner ring having a sealing surface at one end for resiliently yieldable engagement with an opposed surface of a relatively rotatable part, an outer ring surrounding the inner ring in spaced concentric relation to the latter, and a centrally apertured disk of soft resilient material connected at its inner and outer edges to the rings, said disk being of generally conical shape, with the small end of the cone directed toward said sealing surface, the outer ring including a sheet metal member having an axially extending rim and an inturned end flange set at an acute angle to the rim, and a second sheet metal member positioned within the rim with one of its edges in proximity to the inturned end flange, and the outer portion of the rear conical face of the disk being clampingly held against the inturned end flange in conformity with the latter by the adjacent edge of the second sheet metal member, said angularly disposed end flange extending inwardly to provide a rear support for the rear conical face of the disk a substantial distance inwardly from its outer periphery, whereby to hold the disk against flexing upon axial movement of the inner ring and result in compression of the resilient material of the disk upon such axial movement.

LOUIS G. KRUG.